Feb. 25, 1947. T. R. FINCH ET AL 2,416,297
WAVE TRANSMISSION NETWORK
Filed Oct. 26, 1944
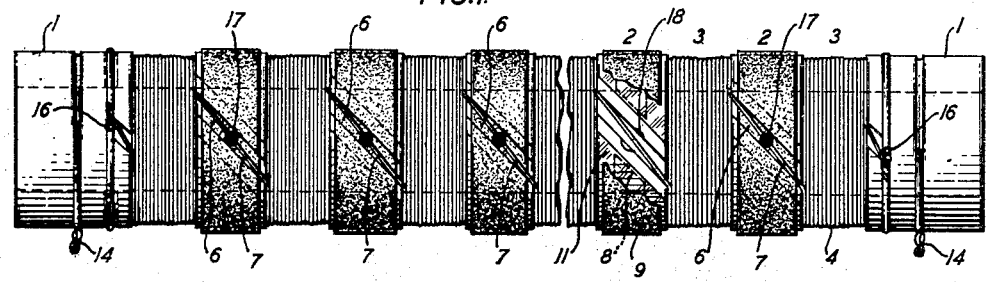
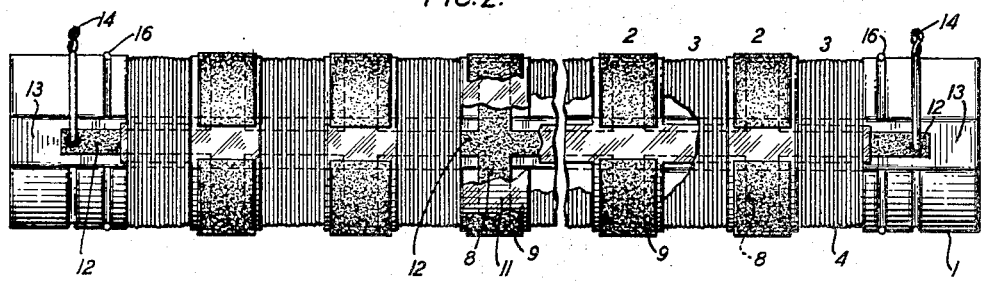
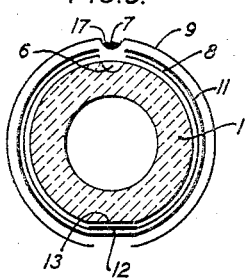 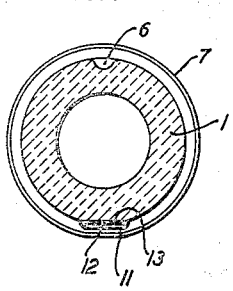 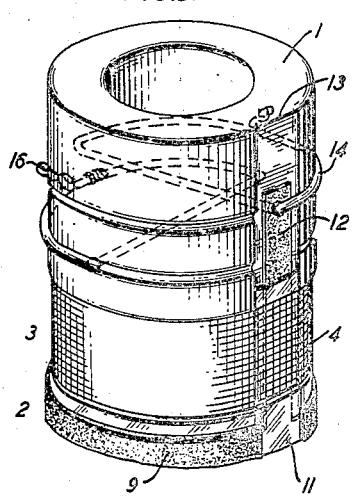
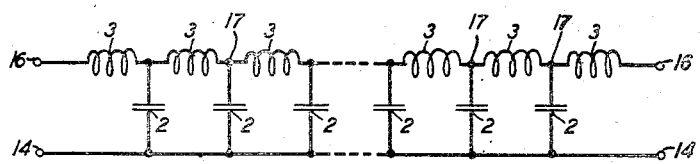
INVENTORS: T. R. FINCH
D. A. McLEAN
BY: Ralph T. Holcomb
ATTORNEY Patented Feb. 25, 1947

2,416,297

UNITED STATES PATENT OFFICE 2,416,297

WAVE TRANSMISSION NETWORK

Tudor R. Finch, Jackson Heights, N. Y., and David A. McLean, Chatham, N. J., assignors to Bell Telephone Laboratories, Incorporated, New York, N. Y., a corporation of New York Application October 26, 1944, Serial No. 560,507

15 Claims. (Cl. 178—44)

This invention relates to wave transmission networks and more particularly to networks of the type having series inductors and interposed shunt capacitors.

The object of the invention is to reduce the size, weight and cost of transmission networks of this type.

Certain types of transmission networks such, for example, as multisection delay networks, require a number of series-connected inductors and interposed shunt capacitors. The present invention provides such a network which is compact, light in weight, and comparatively low in cost. It is particularly advantageous for use in airborne equipment where light weight and small size are of great importance.

The network comprises a tubular form of insulating material, a first set of condenser electrodes formed by applying metallic plating part way around the form at spaced intervals along its length, a layer of dielectric applied over these electrodes, a second set of electrodes formed by applying metallic plating part way around the form over the dielectric, and an inductor comprising a number of series-connected sections wound about the form in the spaces between the capacitors. One set of electrodes, preferably the inner, are electrically connected to form the grounded or equipotential side of the network. The other electrodes, after individual adjustment if required, are connected, respectively, to the junction points between the inductor sections to form a ladder-type network. The electrodes and interelectrode connections may be formed of silver paste, fired in place. The dielectric material may be vitreous enamel.

The nature of the invention will be more fully understood from the following detailed description and by reference to the accompanying drawings, in which like reference characters refer to similar or corresponding parts and in which:

Fig. 1 is a top view of a wave transmission network in accordance with the invention;

Fig. 2 is a bottom view;

Fig. 3 shows one of the capacitors in diagrammatic cross section;

Fig. 4 shows one of the inductor sections in diagrammatic cross section;

Fig. 5 is a perspective view of one end; and

Fig. 6 gives the schematic circuit of the network.

As shown, the network comprises a tubular form 1 made of suitable insulating material, a number of capacitors 2 spaced along its length, and a number of series-connected inductor sections 3 located between the capacitors 2. The form 1 has regions 4 of reduced outer diameter, in which the inductor sections 3 are wound, and connecting grooves 6 to accommodate the wire 7 as it passes from one section to the next. The form 1 may, for example, be made of a ceramic material the major constituent of which is steatite.

Each of the capacitors 2 has an inner electrode 8 which extends part way around the form 1 but stops short of the groove 6 at the top, a layer 11 of dielectric applied over the electrode 8 to cover it completely and an outer electrode 9 which also extends only part way around the form 1 with a break at the bottom. The relationship between the component parts of the capacitor 2 is shown in the diagrammatic cross section of Fig. 3. The electrodes 8 and 9 are permitted to extend only part way around the form 1 in order to avoid the formation of a short-circuited turn which would affect the inductance of the winding 3 and also introduce undesired dissipation. All of the inner electrodes 8 are connected together by a strip of plating 12 which runs along a flattened portion 13 at the bottom of the form 1 and is connected at each end to the semicircular terminal wires 14. The dielectric 11 also, preferably, covers the strip 12. The electrodes 8 and 9 and the connecting strip 12 may be formed in place by applying a coating of silver paste comprising finely divided silver and glass and then firing. The dielectric 11 is preferably formed of vitreous enamel. The area of each outer electrode 9 may be individually adjusted, if required, to provide the desired capacitance.

After the capacitors 2 have been formed in place, the inductor sections 3 are wound, using a continuous wire 7 which is connected at each end to the semicircular terminal wires 16. The relationship of the parts is shown in the diagrammatic cross section of Fig. 4. Each outer electrode 9 is soldered to the wire 7 as shown at 17. A countersink 18 in the form 1 may be provided at this point to facilitate the soldering.

Fig. 6 shows the electrical circuit of the network, which is of the ladder type comprising the series-connected inductor sections 3 and interposed shunt capacitors 2 connected between a pair of input terminals 14, 16 and a similar pair of output terminals. By a proper choice of the values of the inductances and the capacitances and the spacing between the sections 3, the network may, for example, be designed to have a phase characteristic which is substantially linear with frequency. The over-all phase shift, of course, depends upon the number of sections employed. In Figs. 1 and 2 a number of the central sections have been broken out, to save drawing space. The missing sections are indicated in Fig. 6 by the dashed lines. Other types of transmission characteristics may, of course, be obtained, if desired.

What is claimed is:

1. A wave transmission network comprising a form of insulating material, a first set of condenser electrodes constituted by a metallic coating extending part way around said form at spaced intervals along its length, a layer of dielectric over said first set of electrodes, a second set of condenser electrodes constituted by a metallic coating extending part way around said form over said dielectric layer, an inductor comprising a plurality of series-connected sections positioned on said form in the spaces not covered by said electrodes, electrical connections between the electrodes forming one of said sets, and electrical connection from the junction points between said inductor sections, respectively, to each of the other of said electrodes.

2. A network in accordance with claim 1 in which said form is made of ceramic material.

3. A network in accordance with claim 1 in which said form is made of ceramic material, the major constituent of which is steatite.

4. A network in accordance with claim 1 in which said metallic coating comprises silver paste.

5. A network in accordance with claim 1 in which said metallic coating is silver paste comprising finely divided silver and glass.

6. A network in accordance with claim 1 in which said dielectric is vitreous enamel.

7. A network in accordance with claim 1 in which said metallic coating comprises silver paste and said dielectric is vitreous enamel.

8. A wave transmission network comprising a form of insulating material, a plurality of inductor sections located on said form at spaced intervals along its length, and a plurality of capacitors positioned between said inductor sections, each of said capacitors comprising an inner electrode constituted by a metallic coating extending part way around said form, a layer of dielectric over said inner electrode, and an outer electrode constituted by a metallic coating extending part way around said form over said dielectric layer.

9. A network in accordance with claim 8 in which said inductor sections are connected in series.

10. A network in accordance with claim 8 in which said inductor sections are connected in series and said capacitors are connected, respectively, to the junction points between said inductor sections.

11. A network in accordance with claim 8 in which said metallic coating comprises silver paste.

12. A network in accordance with claim 8 in which said dielectric is vitreous enamel.

13. A network in accordance with claim 8 in which said metallic coating comprises silver paste and said dielectric is vitreous enamel.

14. A network in accordance with claim 1 in which said form is tubular.

15. A network in accordance with claim 8 in which said form is tubular.

TUDOR R. FINCH.
DAVID A. McLEAN.

REFERENCES CITED

The following references are of record in the file of this patent:

UNITED STATES PATENTS

| Number | Name | Date |
|---|---|---|
| 2,111,710 | Van Loon | Mar. 22, 1938 |
| 2,321,439 | Verway | June 8, 1943 |
| 2,226,728 | La lande et al. | Dec. 31, 1940 |

FOREIGN PATENTS

| Number | Country | Date |
|---|---|---|
| 472,593 | British | Sept. 27, 1937 |
| 445,082 | British | Apr. 2, 1936 |